3,754,093
Patented Aug. 21, 1973

3,754,093
METHOD FOR PROTECTING PLANTS FROM POWDERY MILDEW FUNGUS AND FUNGICIDAL COMPOSITION TO BE USED THEREFOR

Kenji Shigezane, Mie, Ryuzo Nishiyama, Kyoto, Kanichi Fujikawa, and Kiroyuki Mori, Shiga, Japan, assignors to Ishihara Sangyo Kaisha, Ltd., Osaka, Japan
No Drawing. Filed Apr. 28, 1970, Ser. No. 32,761
Int. Cl. A01n 9/20
U.S. Cl. 424—326     27 Claims

ABSTRACT OF THE DISCLOSURE

A method for protecting plants from powdery mildew fungus by applying to said plants at least one amidine compound selected from the class consisting of compounds represented by the formula $$R^1—NHC(=NH)—R^2$$

wherein $R^2$ represents an alkyl group and $R^1$ represents a group selected from the group consisting of phenyl and naphthyl groups having from 0 to 2 substituents selected from the group consisting of halogen atoms, alkyl, nitro and alkoxy groups and addition salts of said compounds with acids. Also contemplated are fungicidal compositions for the control of powdery mildew fungus containing the above-mentioned compounds as the active ingredients.

BACKGROUND OF THE INVENTION

(1) Field of the invention

The present invention relates to a method for protecting plants from powdery mildew fungus by applying an amidine compound and to fungicidal compositions containing such amidine compounds.

(2) Description of prior art

Powdery mildew fungus causes serious damage to cultivated vegetables, such as cucumbers, melons, strawberrys, eggplants, and green peppers; cereals such as wheat; fruit, such as apples and pears; flowering plants, such as roses and chrysanthemums; and pasture plants, such as clover and Italian ryegrass.

This fungus is so vital that, even if the white spores thereof are killed by breaking, it soon resuscitates and is therefore extremely difficult to eradicate by means of fungicidal chemicals. The complete protection of plants from powdery mildew fungus requires destruction of the fungus both inside and outside of the host tissues. The control of powdery mildew fungus has been found to be extremely difficult.

In fact, many conventional fungicides exert insufficient controlling effects on powdery mildew and, in particular, conventional fungicides have proved insufficient for curative control on plants already infected by the fungus. If such fungicides are applied so as to obtain fairly satisfactory control effects, phytotoxicity toward cultivated plants would be likely.

An object of the present invention is to provide a method of protecting cultivated plants effectively from powderly mildew fungus by applying chemicals which are not phytotoxic and cause substantially no damage to the plants.

Another object of this invention is to provide novel fungicidal compositions capable of protecting cultivated plants from powdery mildew fungus without causing any substantial damage to the cultivated plants.

Other objects and advantages of this invention will become apparent from the following description.

SUMMARY OF THE INVENTION

According to the present invention there is provided a method of protecting plants from powdery mildew fungus by applying at least one amidine compound selected from the group consisting of compounds represented by the formula $$R^1—NHC(=NH)—R^2$$

wherein $R^2$ represents an alkyl group and $R^1$ represents a group selected from the group consisting of phenyl and naphthyl groups having from 0 to 2 substituents selected from the group consisting of halo, alkyl, nitro, and alkoxy and acid-addition sals of said compounds, said compounds being applied to the locus of cultivation of the plants in a concentration sufficient to exert fungicidal action on powdery mildew fungus.

Also provided according to the present invention are fungicidal compositions containing the aforesaid amidine compounds for control of powdery mildew fungus.

DETAILED DESCRIPTION OF THE INVENTION

The preparation of the aforesaid amidine compounds will now be described below with reference to the preparation of N-(2-methylphenyl) propionamidine, its oxalate and N-(2,4-dimethylphenyl)acetamidine and its oxalate. Other amidine compounds represented by the aforesaid general formula may be prepared according to procedures such as that described below.

PREPARATION OF N-(2-METHYLPHENYL)PROPIONAMIDINE AND ITS OXALATE

In a flask, 10.7 g. of o-toluidine was mixed with 5.5 g. of propionitrile and, after adding 13 g. of powdered anhydrous aluminum chloride while cooling the mixture with water from the outside of the flask, the resultant mixture was heated to 140° C. on an oil bath for 3 hours. Water was added to the reaction mixture. An aqueous solution of the product was rendered alkaline with sodium hydroxide and extracted with chloroform. The chloroform was removed from the extract thus obtained, and a saturated acetone solution of oxalic acid was added to the residue. The crystalline precipitate was filtered and then recrystallized from aqueous acetone to provide 7.6 g. of N-(2-methylphenyl)propioamidine oxalate crystals having a melting point of 164–166° C.

The oxalate prepared above was then dissolved in water and the solution was rendered alkaline with aqueous sodium hydroxide solution. After extracting the product with chloroform, the extract was dehydrate with anhydrous sodium sulfate and the chloroform was removed from the dehydrated product to provide 4.0 g. of oily N-(2-methylphenyl)propionamidine.

PREPARATION OF N-(2,4-DIMETHYLPHENYL) ACETAMIDINE AND ITS OXALATE

In a flask, 12.1 g. of 2,4-dimethylaniline was mixed with 4.2 g. of acetonitrile and, after adding 13 g. of powdered anhydrous aluminum chloride while cooling the mixture was heated to 125° C. on an oil bath for 5 hours. Treating the reaction product in the same way as described above, 8.4 g. of N-(2,4-dimethylphenyl)acetamidine oxalate crystals having a melting point of 199–210° C. was obtained. From the oxalate, 2.5 g. of oil N-(2,4-dimethylphenyl)acetamidine was obtained, as above.

EXAMPLE 1

Soil was charged into unglazed pots, each having a diameter of 9 cm. and five seeds of cucumber were sowed in each pot. When their cotyledons were completely developed and the first leaves began to sprout, powdery mildew fungus (Sphaerotheca fuliginea) was inoculated upon the cotyledons. Three days after the inoculation, 10 ml. of the fungicidal composition which had just been prepared as shown below was uniformly sprayed onto each pot. Ten to fourteen days after the spraying, the degree of the fungus infection was visually observed. The results are shown in Table 1. "Non-treated" in the table (test number 82) refers to a lot which was not treated with the fungicidal composition. Each of the fungicidal compositions used in tests 1–27 and 56–81 was prepared by mixing together 50 parts by weight of the fungicidal active ingredient of this invention, 40 parts by weight of xylol, and 10 parts by weight of polyoxyethylene glycol to provide an emulsifiable concentrate and diluting it with water to the indicated concentration. The fungicidal compositions employed in tests 28–55 were prepared by diluting the respective fungicidal active ingredients directly with water to the indicated concentration.

The results of the fungus infections were rated in Table 1 on a scale of from 0 to 4 as follows:

0: No infection
1: Slightly infected
2: Moderately infected
3: Severely infected
4: Very severely infected In the following, the active ingredient is N-R-propionamide wherein R is as indicated.

TABLE 1a

| Test No. | R | Melting point | Degree of fungus infection | | |
|---|---|---|---|---|---|
| | | | 1,000 p.p.m. | 500 p.p.m. | 250 p.p.m |
| 1 | Phenyl | 71.5–73 | 0 | 2 | 2 |
| 2 | 2-methylphenyl | ¹ Liquid | 0 | 0 | 0 |
| 3 | 3-methylphenyl | Liquid | | 3 | 3 |
| 4 | 4-methylphenyl | 94–96 | 0 | 2 | 3 |
| 5 | 2-nitrophenyl | Liquid | 0 | 3 | 1 |
| 6 | 3-nitrophenyl | 127.5–129 | 0 | 1 | 4 |
| 7 | 4-nitrophenyl | 134.5–136 | 0 | 1 | 4 |
| 8 | 2-methoxyphenyl | Liquid | 0 | 1 | 3 |
| 9 | 3-methoxyphenyl | 76–78 | 0 | 3 | 3 |
| 10 | 4-methoxyphenyl | 66–67.5 | 0 | 1 | 4 |
| 11 | 2-ethoxyphenyl | Liquid | 0 | | |
| 12 | 3-ethoxyphenyl | 65–67 | | 1 | 4 |
| 13 | 4-ethoxyphenyl | Liquid | 0 | 1 | 3 |
| 14 | 2-chlorophenyl | Liquid | 0 | 0 | 1 |
| 15 | 4-chlorophenyl | 77.5–79 | 0 | 1 | 1 |
| 16 | 2,3-dichlorophenyl | 44–47 | 0 | 1 | 2 |
| 17 | 2,4-dichlorophenyl | Liquid | 0 | 0 | 0 |
| 18 | 2,5-dichlorophenyl | Liquid | 0 | 1 | 3 |
| 19 | 2,6-dichlorophenyl | 133–135 | 0 | 1 | 4 |
| 20 | 3,5-dichlorophenyl | 70–72 | 0 | 1 | 3 |
| 21 | 2,3-dimethylphenyl | Liquid | 0 | | |
| 22 | 2,4-dimethylphenyl | Liquid | 0 | 0 | 1 |
| 23 | 2,5-dimethylphenyl | Liquid | 0 | 0 | 1 |
| 24 | 2,6-dimethylphenyl | 77–78.5 | 0 | 1 | 2 |
| 25 | 3,4-dimethylphenyl | 46.5–48 | 0 | 2 | 4 |
| 26 | 1-naphthyl | Liquid | 0 | 0 | 1 |
| 27 | 2-naphthyl | Liquid | 0 | 0 | 1 |

¹ Liquid indicates that the compound is liquid at room temperature

In the following, the active ingredient is N-R-propionamidine oxalate, wherein R is as indicated.

TABLE 1b

| Test No. | R | Melting point | Degree of fungus infection | | |
|---|---|---|---|---|---|
| | | | 1,000 p.p.m. | 500 p.p.m. | 250 p.p.m. |
| 28 | Phenyl | 168–168.5 | 0 | 0 | 1 |
| 29 | 2-chlorophenyl | 167.5–169 | 0 | 0 | 2 |
| 30 | 3-chlorophenyl | 150–152 | 0 | 0 | 0 |
| 31 | 4-chlorophenyl | 188–189 | 0 | 1 | 2 |
| 32 | 2-methylphenyl | 167–168 | 0 | 0 | 0 |
| 33 | 3-methylphenyl | 184–185 | 0 | 0 | 0 |
| 34 | 4-methylphenyl | 167–169 | 0 | 0 | 1 |
| 35 | 2-nitrophenyl | 148–149 | 0 | 1 | 2 |
| 36 | 3-nitrophenyl | 181–182 | 0 | 1 | 1 |
| 37 | 4-nitrophenyl | 193.5–196 | 0 | 1 | 1 |
| 38 | 2-methoxyphenyl | 173.5–174.5 | 0 | 3 | 3 |
| 39 | 3-methoxyphenyl | 158.5–160 | 0 | 1 | 3 |
| 40 | 4-methoxyphenyl | 176.5–177 | 0 | 3 | 3 |
| 41 | 2-ethoxyphenyl | 141–142 | 0 | 3 | 3 |
| 42 | 3-ethoxyphenyl | 134–135.5 | 0 | 1 | 1 |
| 43 | 4-ethoxyphenyl | 198–199.5 | 0 | 1 | 1 |
| 44 | 2,3-dichlorophenyl | 184–185 | 0 | 0 | 0 |
| 45 | 2,4-dichlorophenyl | 174.5–176 | 0 | 2 | 2 |
| 46 | 2,5-dichlorophenyl | 172–174 | 0 | 2 | 3 |
| 47 | 2,6-dichlorophenyl | 192–194 | 0 | 1 | 2 |
| 48 | 3,4-dichlorophenyl | 191–192 | 0 | 1 | 1 |
| 49 | 3,5-dichlorophenyl | 176–178.5 | 0 | 1 | 2 |
| 50 | 2,3-dimethylphenyl | 182–182.6 | 0 | 0 | 0 |
| 51 | 2,4-dimethylphenyl | 166–168 | 0 | 0 | 0 |
| 52 | 2,5-dimethylphenyl | 161.5–163 | 0 | 0 | 1 |
| 53 | 2,6-dimethylphenyl | 181–183 | 0 | 3 | 3 |
| 54 | 3,4-dimethylphenyl | 165.5–167 | 0 | 3 | 3 |
| 55 | 1-naphthyl | 219–221 | 0 | 1 | 1 |

In the following, the active ingredient is N-R-acetamidine, wherein R is as indicated.

TABLE 1c

| Test No. | R | Melting point | Degree of fungus infection | | |
|---|---|---|---|---|---|
| | | | 1,000 p.p.m. | 500 p.p.m. | 250 p.p.m |
| 56 | Phenyl | Liquid | 0 | 1 | 2 |
| 57 | 2-chlorophenyl | Liquid | 0 | 0 | 2 |
| 58 | 3-chlorophenyl | Liquid | 0 | 0 | 2 |
| 59 | 4-chlorophenyl | 113–114 | 0 | 1 | 2 |
| 60 | 2-methylphenyl | | 0 | 0 | 2 |
| 61 | 3-methylphenyl | | 0 | 0 | 1 |
| 62 | 4-methylphenyl | 107–110 | 0 | 1 | 2 |
| 63 | 2-nitrophenyl | Liquid | 0 | 2 | 4 |
| 64 | 3-nitrophenyl | 138–143 | 0 | 1 | 4 |
| 65 | 4-nitrophenyl | 158–162 | 0 | 1 | 4 |
| 66 | 2-methoxyphenyl | Liquid | 0 | 1 | 3 |
| 67 | 3-methoxyphenyl | 105–107 | 0 | 3 | 4 |
| 68 | 4-methoxyphenyl | 78–80 | 0 | 2 | 4 |
| 69 | 2-ethoxyphenyl | Liquid | 0 | 1 | 4 |
| 70 | 3-ethoxyphenyl | 84–85 | 1 | 2 | 4 |
| 71 | 4-ethoxyphenyl | 102–105 | 1 | 3 | 3 |
| 72 | 2,3-dichlorophenyl | Liquid | 0 | 0 | 1 |
| 73 | 2,4-dichlorophenyl | Liquid | 0 | 4 | 4 |
| 74 | 2,5-dichlorophenyl | Liquid | 0 | 1 | 4 |
| 75 | 3,5-dichlorophenyl | 72.5–74 | 0 | 3 | 2 |
| 76 | 2,3-dimethylphenyl | Liquid | 0 | 0 | 1 |
| 77 | 2,4-dimethylphenyl | Liquid | 0 | 0 | 0 |
| 78 | 2,5-dimethylphenyl | | 0 | 0 | 1 |
| 79 | 2,6-dimethylphenyl | Liquid | 0 | 0 | 4 |
| 80 | 3,4-dimethylphenyl | Liquid | 0 | 1 | 3 |
| 81 | 1-naphthyl | Liquid | 0 | 1 | 3 |
| 82 | Non-treated | | | 4 | |

In the tests, the above compositions exhibited no phytotoxicity toward the cucumber seedlings, either by growth inhibition or injury.

For comparison, the same experiments were repeated using the following compounds which are outside the scope of the present invention. These compounds proved either ineffective or injurious to the plants in the concentration range where the fungicidal active ingredients of the present invention showed sufficient control effects on powdery mildew fungus.

The compounds used in the comparison tests were N,N-dimethyl-N'-phenylformamidine, N,N-dimethyl-N'-(4-chlorophenyl)-formamidine, N,N-dimethyl-N'-(3-chlorophenyl)formamidine, N,N-dimethyl-N' - (4-methoxyphenyl) formamidine, N,N-dimethyl - N'-(1-naphthyl) formamidine, and N,N-dimethyl-N'-(3,4-dichlorophenyl formamidine. For example, N,N-dimethyl-N'-(1-naphthyl) formamidine showed a weak fungicidal effect; N,N-dimethyl-N'-(3,4-dichlorophenyl) formamidine caused the death of the sample cucumber seedlings and N,N-dimethyl-N'-(4-chlorophenyl) formamidine inhibited the growth of cucumber seedlings.

EXAMPLE 2

Three-year-old rose seedlings (Variety Queen Elizabeth) each fertilized and tended in a customary manner in a deep unglazed pot having a diameter of 18 cm. were placed in a vinyl resin chamber. Four rose seedlings were grouped as one lot. The control of powdery mildew fungas (Sphaerotheca pannosa) on the roses was effected on one lot each in Tests 1 and 2 and on two lots in Test 3 in Table 2 below. Slight growth of powdery mildew fungus was observed on all test roses about September 20. An aqueous solution of N-(2-methylphenyl) propionamidine oxalate of the concentration indicated was uniformly sprayed onto the roses at a rate of 80 ml. per pot by means of a sprayer on September 21, September 28, and October 5, respectively. The growth of the roses was observed on October 9 and the number of diseased (powdery mildew-infected) and healthy leaves observed. The results are shown in Table 2, in which the non-treated lot is a lot which was not treated with any chemical.

TABLE 2

| Test No. | Test lot | Concentration (p.p.m.) | Number of— | | |
|---|---|---|---|---|---|
| | | | Leaves checked | Healthy leaves | Diseased leaves |
| 1 | Treated | 500 | 668 | 660 | 8 |
| 2 | do | 250 | 527 | 500 | 27 |
| 3 | Non-treated | | 231 | 180 | 51 |

No phytotoxicity toward the roses was observed.

EXAMPLE 3

Seedlings of cucumber were transplanted on July 23 and powdery mildew fungus (*Sphaerotheca fuliginea*) was controlled. A fungicidal composition prepared as shown below was sprayed on ten cucumber plants (one plant had ten leaves) by means of a sprayer on August 13, August 24, September 3 and September 14 soon after the preparation thereof. On August 29, September 16 and October 4, the number of the diseased leaves was observed and the percentage of diseased leaves as compared to the total of 200 leaves was calculated. These percentages are shown in Table 3 as the Ratio of Diseased Leaves. The non-treated lot in the table is a lot not treated with a fungicidal chemical.

The fungicidal composition used above was prepared by mixing 50 parts by weight of N-(2-methylphenyl)propionamidine, 30 parts by weight of xylene, and 20 parts by weight of polyoxyethylene glycol and diluting the emulsifiable concentrate with water to the indicated concentration.

| Test lot | | Concentration of the active ingredient (p.p.m.) | Aug. 29, ratio of diseased leaves (percent) | Sept. 16, ratio of diseased leaves (percent) | Oct. 4, ratio of diseased leaves (percent) |
|---|---|---|---|---|---|
| Number: | | | | | |
| 1 | Treated | 1,000 | 4.0 | 0 | 13.5 |
| 2 | do | 500 | 4.0 | 0 | 27.5 |
| 3 | do | 250 | 6.5 | 0 | 25.6 |
| 4 | Non-treated | | 43.0 | 100 | 96.0 |

No phytotoxicity towards the cucumber was observed.

EXAMPLE 4

Melon seedlings were transplanted to the field and cultivated in the ordinary manner. Control of powdery mildew fungus on the melon was effected. On June 24, July 1, and July 9, about 250 liters per 10 acres of an aqueous solution of N-(2,4-dimethylphenyl)acetamidine hydrochloride of the indicated concentration, prepared as in Example 2, was sprayed onto the melon plants. On September 11, the number of spots of powdery mildew fungus disease on the melon leaves in each lot was measured. The results are shown in Table 4.

TABLE 4

| Test lot | | Concentration of active ingredient (p.p.m.) | Number of diseased spots per leaf |
|---|---|---|---|
| Number: | | | |
| 1 | Treated | 500 | 0.03 |
| 2 | do | 250 | 0.09 |
| 3 | Non-treated | | 147.5 |

No phytotoxicity towards the melon plants was observed.

The above examples shall not limit the scope of this invention. In other words, other amidine compounds represented by the aforesaid general formula than those illustrated in the above examples possess the same fungicidal activities as the aforesaid compounds. For example, naphthylamidine compounds having one or two substituents, either the same or different from each other, phenylamidine compounds substituted simultaneously by two different substituents, and addition salts of these compounds with acids, such as oxalic, sulfuric, hydrochloric, p-toluenesulfonic, acetic and propionic acid, also are satisfactory.

Among these amidine compounds, a phenylamidine compound, a phenylamidine compound substituted by chlorine or a methyl group, a naphthylamidine compound, and a chlorine-substituted naphthylamidine compound demonstrate better results. It has been confirmed that of these compounds, phenylacetamidine, monomethylphenylacetamidine, dimethylphenylacetamidine, monochlorophenylactamidine, phenylpropionamidine, monomethylphenylpropionamidine, dimethylphenylpropionamidine, monochlorophenylpropionamidine, and the salts thereof, each demonstrate excellent results.

Among the halogen-substituted phenylamidine compounds included within the scope of the above formula, the bromine- or fluorine-substituted compounds demonstrate good results only slightly below those of the chlorine-substituted compounds.

As the alkyl group comprising $R^2$ in the aforesaid general formula, lower alkyl groups, those having 1–6 carbon atoms, such as methyl, ethyl, n-propyl, iso-propyl, sec-butyl, n-butyl, ter-butyl, phenyl, and hexyl groups demonstrate better results. The alkoxy groups comprising $R^1$ which exhibit better results also include those having 1–6 carbon atoms, such as methoxy, ethoxy, propoxy, butoxy, pentoxy, and hexoxy group.

Of the acid-addition salts of the aforesaid amidine compounds, the oxalates and hydrochlorides demonstrate better results.

Concentrations of the active ingredients to be applied according to the method of this invention vary depending upon the particular compound and cultivated plant, the form of the fungicidal composition, the manner of applying the fungicidal composition, and the time of application, but usually range between 100 and 2,000 p.p.m., preferably 200–1,000 p.p.m. Concentrations below 100 p.p.m. provide insufficient fungicidal effects. At concentrations higher than 2,000 p.p.m., on the other hand, some compounds of the present invention may cause damage to some plants. The rate of application of the fungicidally active ingredient is usually 20–400 g., preferably 40–100 g. per 10 ares. Application rates outside of the above range result in the same tendencies as mentioned above in the case of the concentration of the active ingredient.

The method and the fungicidal compositions of this invention have a curative effect on plants already infected by powdery mildew. Conventional methods or fungicidal compositions have usually proved inadequate to cure already infected plants by powdery mildew fungus. On the other hand, the fungicidal compositions of the present invention can sufficiently protect plants from the invasion of powdery mildew fungus without phytotoxicity by preliminary application of the composition to the plants.

The fungicidal compositions of this invention may be employed in the form of dusts, emulsifiable concentrates, water-soluble powders, wettable powders or aerosols, which may be prepared by admixing the aforesaid amidine compound with an inert carrier and, if required, an adjuvant.

As the carrier used in this invention, there may be mentioned conventional solid carriers such as talc, kaoline, zeeklite (finely divided clay mineral powder), diatomaceous earth and starch; liquid diluting agents such as water, alcohols, acetone, zylene, benzene, solvent naphtha and isophorone; and gaseous carriers such as nitrogen, carbon dioxide or Freon and the like.

The above-mentioned adjuvant includes, for instance, emulsifying dispersants, such as sodium alkylbenzenesulfonates; sodium higher alcohol sulfonates; polyoxyethylene alkyl allyl ethers; polyoxyethylene glycol alkyl ethers, calcium ligninesulfonate, polyvinyl alcohol and the like.

Almost all of the aforesaid amidine compounds are soluble in water to an extent sufficient for the purposes of this invention and therefore, may be used as an aqueous solution without the use of an adjuvant. Such aqueous amidine solutions are particularly convenient for application, as compared with the use of an adjuvant, since formulation before use can be omitted and there is no fear of contamination of plants with it. Such aqueous amidine solutions may be safely applied to vegetables and flowering plants without fear of hygienic or ornamental contamination.

However, some of the aforesaid amidine compounds are hydrolyzed when stored for long periods of time in the form of aqueous solutions and do not exert the desired effects of this invention. In such case, other forms of application may be used. Alternatively, the fungicidal compositions prepared in the various forms described above may be applied directly or after having been diluted just prior to application.

What is claimed is:

1. A method for controlling *Sphaerotheca fuliginea* on plants which comprises:
applying to said infected plants a fungicidally effective amount of
N-(2-methylphenyl)propionamidine or the acid addition salts thereof.

2. The method of claim 1, wherein said acid component of said acid-addition salts is a member selected from the group consisting of oxalic acid, sulfuric acid, hydrochloric acid, p-toluene sulfonic acid, acetic acid, and propionic acid.

3. The method of claim 1, wherein said compound is sprayed onto said fungus.

4. A method for controlling *Sphaerotheca fuliginea* on plants which comprises:
applying to said infected plants a fungicidally effective amount of
N-(3-chlorophenyl)propionamidine or the acid addition salts thereof.

5. The method of claim 4, wherein said acid component of said acid-addition salts is a member selected from the group consisting of oxalic acid, sulfuric acid, hydrochloric acid, p-toluene sulfonic acid, acetic acid, and propionic acid.

6. The method of claim 4, wherein said compound is sprayed onto said fungus.

7. A method for controlling *Sphaerotheca fuliginea* on plants which comprises:
applying to said infected plants a fungicidally effective amount of
N-(3-methylphenyl)acetamidine or the acid addition salts thereof.

8. The method of claim 7, wherein said acid component of said acid-addition salts is a member selected from the group consisting of oxalic acid, sulfuric acid, hydrochloric acid, p-toluene sulfonic acid, acetic acid, and propionic acid.

9. The method of claim 7, wherein said compound is sprayed onto said fungus.

10. A method for controlling *Sphaerotheca fuliginea* on plants which comprises:
applying to said infected plants a fungicidally effective amount of
N-(2,3-dichlorophenyl)acetamidine or the acid addition salts thereof.

11. The method of claim 10, wherein said acid component of said acid-addition salts is a member selected from the group consisting of oxalic acid, sulfuric acid, hydrochloric acid, p-toluene sulfonic acid, acetic acid, and propionic acid.

12. The method of claim 10, wherein said compound is sprayed onto said fungus.

13. A method for controlling *Sphaerotheca fuliginea* on plants which comprises:
applying to said infected plants a fungicidally effective amount of
N - (2,3 - dimethylphenyl)propionamidine or the acid addition salts thereof.

14. The method of claim 13, wherein said acid component of said acid-addition salts is a member selected from the group consisting of oxalic acid, sulfuric acid, hydrochloric acid, p-toluene sulfonic acid, acetic acid, and propionic acid.

15. The method of claim 13, wherein said compound is sprayed onto said fungus.

16. A method for controlling *Sphaerotheca fuliginea* on plants which comprises:
applying to said infected plants a fungicidally effective amount of
N-(2,4-dimethylphenyl)acetamidine or the acid addition salts thereof.

17. The method of claim 16, wherein said acid component of said acid-addition salts is a member selected from the group consisting of oxalic acid, sulfuric acid, hydrochloric acid, p-toluene sulfonic acid, acetic acid, and propionic acid.

18. The method of claim 16, wherein said compound is sprayed onto said fungus.

19. A method for controlling *Sphaerotheca fuliginea* on plants which comprises:
applying to said infected plants a fungicidally effective amount of
N - (2,4 - dimethylphenyl)propionamidine or the acid addition salts thereof.

20. The method of claim 19, wherein said acid component of said acid-addition salts is a member selected from the group consisting of oxalic acid, sulfuric acid, hydrochloric acid, p-toluene sulfonic acid, acetic acid, and propionic acid.

21. The method of claim 19, wherein said compound is sprayed onto said fungus.

22. A method for controlling *Sphaerotheca fuliginea* on plants which comprises:
applying to said infected plants a fungicidally effective amount of
N-(2,5-dimethylphenyl)acetamidine or the acid addition salts thereof.

23. The method of claim 22, wherein said acid component of said acid-addition salts is a member selected from the group consisting of oxalic acid, sulfuric acid, hydrochloric acid, p-toluene sulfonic acid, acetic acid, and propionic acid.

24. The method of claim 22, wherein said compound is sprayed onto said fungus.

25. A method for controlling *Sphaerotheca fuliginea* on plants which comprises:
applying to said infected plants a fungicidally effective amount of
N - (2,5 - dimethylphenyl)propionamidine or the acid addition salts thereof.

26. The method of claim 25, wherein said acid component of said acid-addition salts is a member selected from the group consisting of oxalic acid, sulfuric acid, hydrochloric acid, p-toluene sulfonic acid, acetic acid, and propionic acid.

27. The method of claim 25, wherein said compound is sprayed onto said fungus.

References Cited

UNITED STATES PATENTS

| | | | |
|---|---|---|---|
| 2,736,748 | 2/1956 | Maliphant et al. | 260—564 |
| 3,206,468 | 9/1965 | Grenda | 260—302 |

FOREIGN PATENTS

| | | |
|---|---|---|
| 485,406 | 3/1970 | Switzerland. |

ALBERT T. MEYERS, Primary Examiner

A. J. ROBINSON, Assistant Examiner